United States Patent [19]

Oliver et al.

[11] Patent Number: 5,092,194

[45] Date of Patent: Mar. 3, 1992

[54] DEPLOYMENT ARRANGEMENT

[75] Inventors: David J. Oliver; William Moore, both of Preston; Colin Payne; Don Ware, both of Hamble, all of United Kingdom

[73] Assignees: British Aerospace Public Limited Company, London, United Kingdom; Aerostructures Hamble Limited, Hamble, United Kingdom

[21] Appl. No.: 403,581

[22] Filed: Sep. 6, 1989

[30] Foreign Application Priority Data

Sep. 6, 1988 [GB] United Kingdom ............... 8820920

[51] Int. Cl.⁵ .............................................. F16C 1/10
[52] U.S. Cl. ..................................... 74/500.5; 74/502; 244/135 A
[58] Field of Search ............... 244/135 A, 135 R; 74/500.5, 502

[56] References Cited

U.S. PATENT DOCUMENTS

| 3,067,972 | 12/1962 | Mosher | 74/500.5 X |
| 3,091,419 | 5/1963 | Mosher | 244/135 A |
| 3,599,907 | 8/1971 | Ransom | 244/135 A |
| 3,951,361 | 4/1976 | Hrusch | 244/102 R |
| 4,072,283 | 2/1978 | Weiland | 244/135 A |
| 4,540,144 | 9/1985 | Perrella | 244/135 A |
| 4,586,683 | 5/1986 | Kerker | 244/135 A |

FOREIGN PATENT DOCUMENTS

| 1107090 | 5/1961 | Fed. Rep. of Germany . |
| 1956174 | 5/1971 | Fed. Rep. of Germany . |
| 1472296 | 5/1977 | United Kingdom . |

*Primary Examiner*—Vinh T. Luong
*Attorney, Agent, or Firm*—Young & Thompson

[57] ABSTRACT

A deployment arangement comprises an inner tube 10 pivoted to ground at 'P' and carrying an outer tube 12 for telescoping movement. The inner end of the outer tube 12 carries a collar assembly 14 which is pivotally connected to a drive or radius arm 18 which is pivoted to ground at 'Q'. The radius arm 18 carries a drive plate 50 which defines a cam track in which a cam follower runs. The mechanism is driven by a ram 20. On actuation of the ram 20, the consequent rotation of a drive plate relative to the collar assembly 14 initially executes a programmed rotation of the outer tube 12 about its longitudinal axis and then locks the outer tube against rotation. Thereafter, the outer tube 12 extends telescopically relative to the inner tube and the inner tube pivots about 'P'.

10 Claims, 11 Drawing Sheets

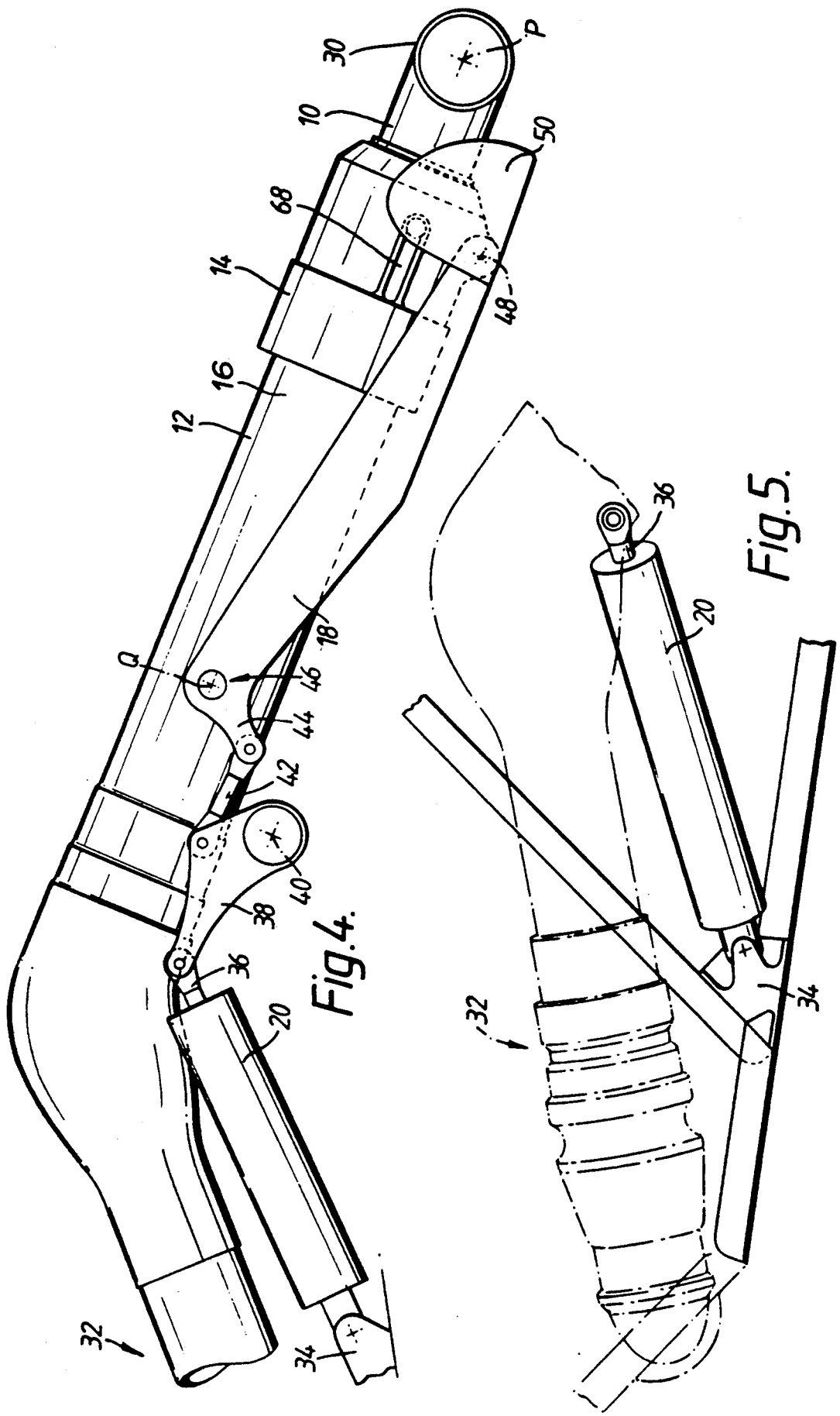

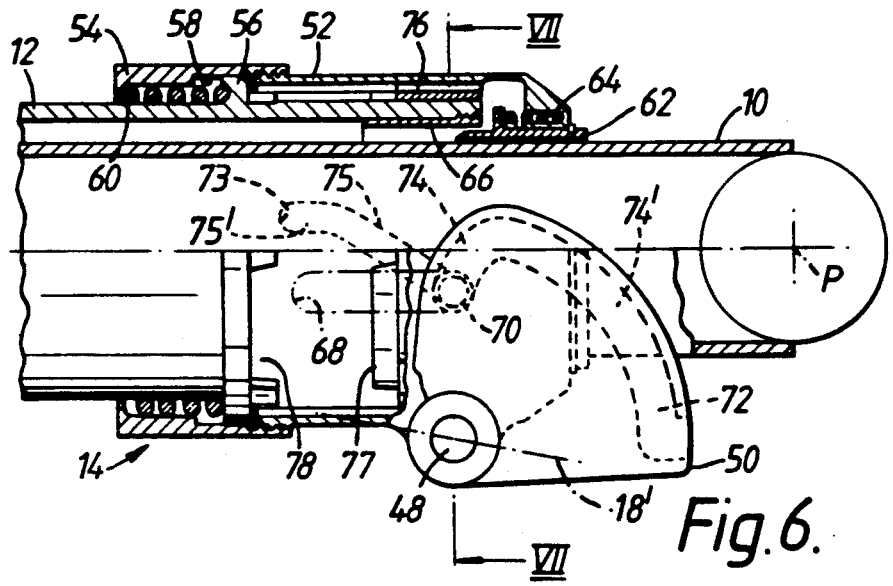
Fig. 6.
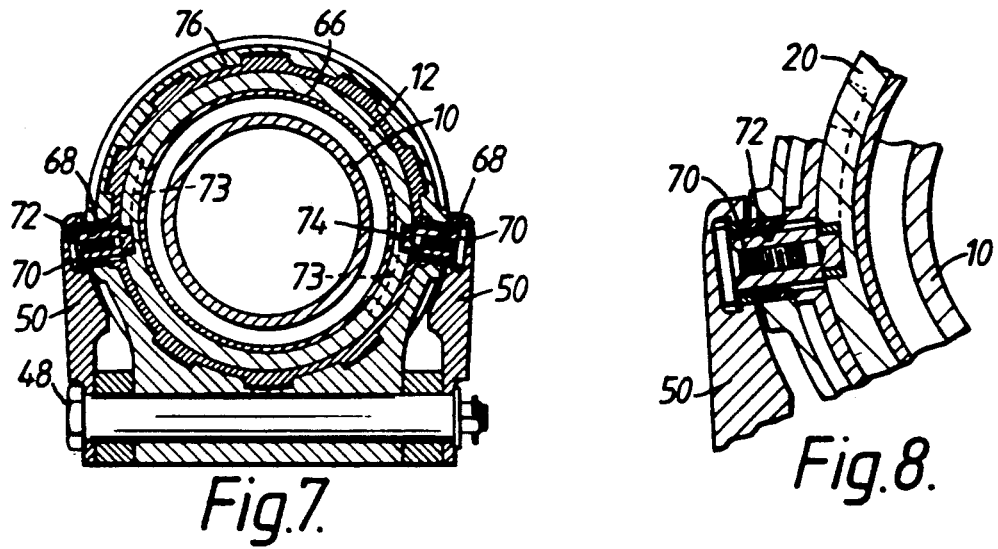
Fig. 7.
Fig. 8.
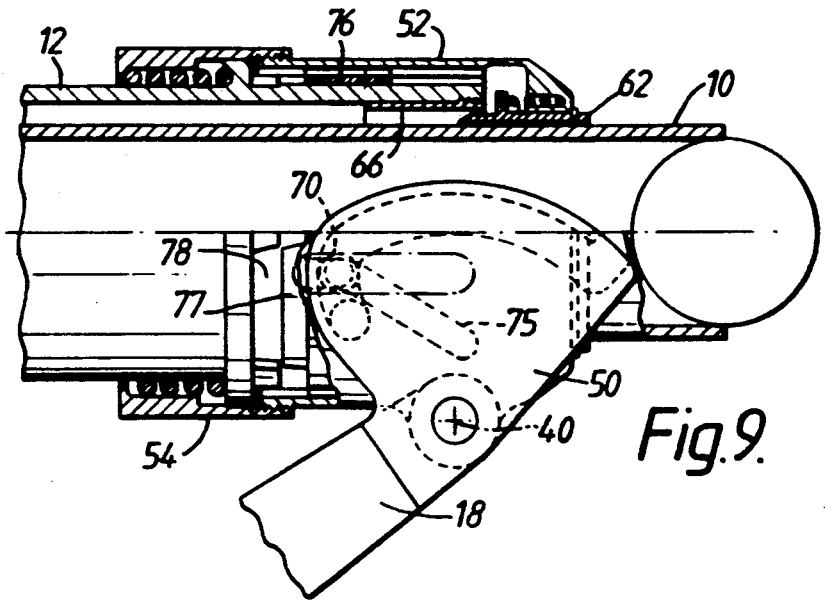
Fig. 9.

DEPLOYMENT ARRANGEMENT

FIELD OF THE INVENTION

This invention relates to a deployment arrangement for deployment a member such as, e.g., an arm. In particular, though not exclusively, the invention is concerned with the deployment of an in-flight refuelling probe.

In many applications, it is required to deploy an arm or probe from a stowed state, and often the constraints on the stowage volume are severe. This is particularly so where the deployable structure is carried by an aircraft. Examples of such structures are in-flight refuelling probes, landing gear, retractable pylons, arrester hooks etc. Similar considerations apply elsewhere too; for example on board spacecraft and in many other applications.

SUMMARY OF THE INVENTION

According to this invention, there is provided a deployment arrangement comprising two arm members connected for relative sliding movement with one of said arm members being mounted for pivotal movement relative to a fixed structure, a collar assembly provided adjacent said arm members, a radius arm means mounted for pivotal movement relative to said fixed structure and pivotally coupled to said collar assembly, and control means responsive to pivotal movement of said radius arm means relative to said collar assembly to apply a predetermined angular displacement between said arm members.

Preferably, said control means includes cam track means and cam follower means associated one with collar assembly and one with one of said arm members respectively.

Preferably, said cam track means is associated with said radius arm means and said cam follower is associated with said one arm member.

The deployment arrangement preferably includes locking means for releasably locking the arm members, said locking means being operable in response to a predetermined pivotal movement of said radius arm means relative to said collar assembly.

The locking pieces may include two complementary locking pieces movable axially into locking engagement, one locking piece associated with each arm member respectively.

In one arrangement said locking pieces comprise a toothed portion associated with one of said arm members and a complementary toothed portion associated with said collar assembly.

Preferably, the arrangement includes an axial lock operable releasably to lock the two arm members against relative axial movement in at least one sense and the axial lock may include a locking claw movable to lock the arm members against axial movement and a release member for releasing the claw.

A preferred embodiment provides a deployment mechanism which employs a single actuator yet deploys a member along a path which requires rotation about two different rotational axes together with a telescoping action. This means that the location and orientation of the deployable member when stowed can be selected to suit the stowage volume available rather than being dictated solely by the shape of the deployable member when deployed.

In addition, the specific embodiment provides means whereby the telescopic action and one of the rotational actions may be locked when the mechanism is fully deployed. This means that a substantial proportion of any forces generated during operation of the deployed mechanism are transmitted along the deployed member to be reacted by the main pivotal connection, so that a relatively small, lightweight actuator may be used.

BRIEF DESCRIPTION OF THE DRAWINGS

The invention may be performed in various ways and two specific embodiments thereof will now be described, by way of example, reference being made to the accompanying drawings, in which:

FIG. 4 shows a detail, on an enlarged scale, of the mounting of the probe, and the actuator, on the aircraft of FIG. 1, when the probe is fully stowed;

FIG. 5 shows a detail of the front end of the probe of the aircraft of FIG. 1 when the probe is fully stowed;

FIG. 6 is a longitudinal section view through the collar assembly of the probe when the probe is fully stowed;

FIG. 7 is a transverse section view taken through the collar assembly on lines VII—VII of FIG. 6;

FIG. 8 is a detail view similar to that of FIG. 7, but on an enlarged scale, and showing an alternative section on the locking ring contained within the collar assembly;

FIGS. 9 to 12 inclusive are respective longitudinal section views through the collar assembly of the probe as the probe moves from its stowed configuration to its fully extended configuration;

DESCRIPTION OF THE PREFERRED EMBODIMENTS

Figure 1:
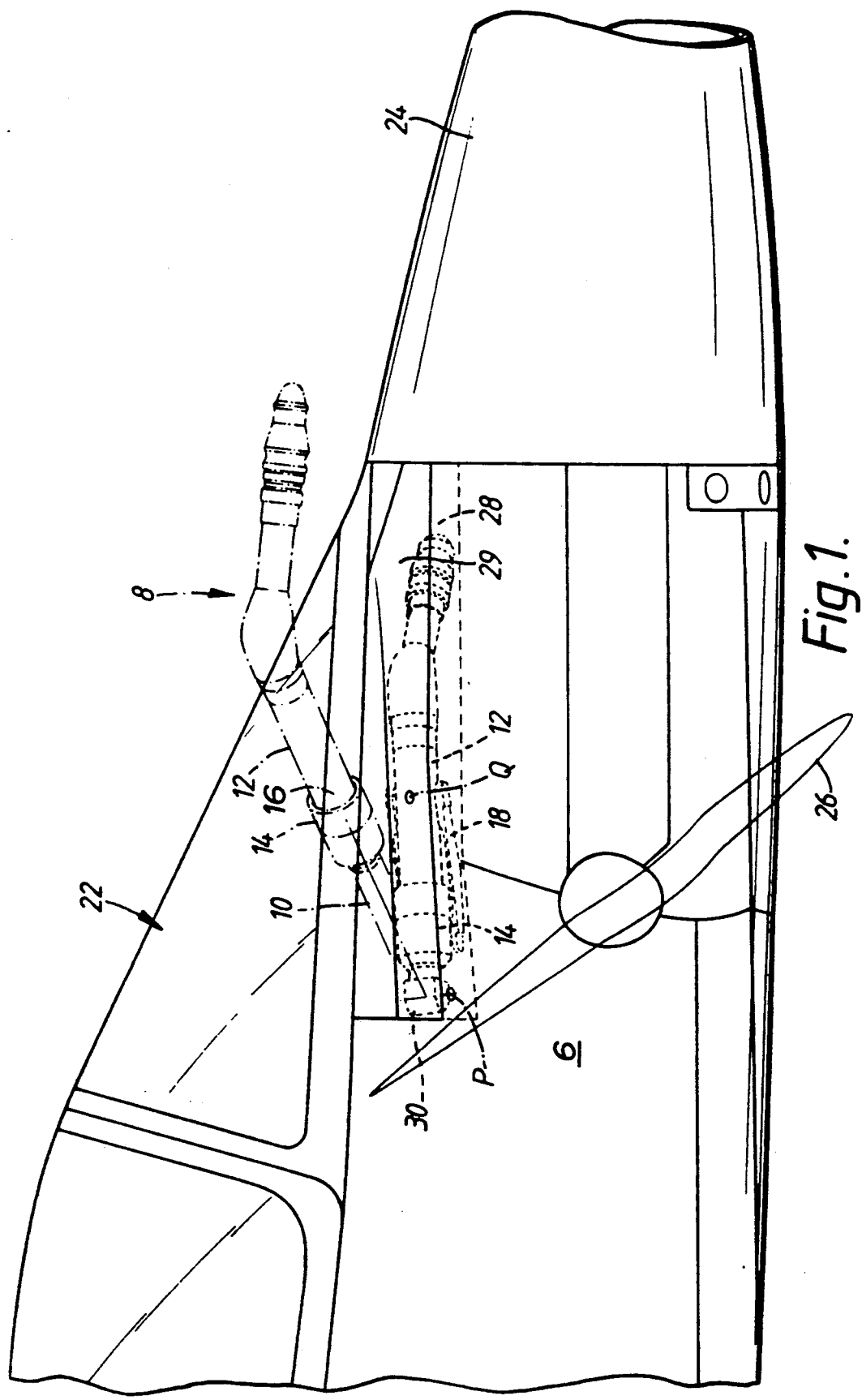
FIG. 1 is a side view of the cockpit region of an aircraft fitted with a flight refuelling probe in accordance with a first embodiment of this invention, showing the probe in both the stowed and deployed configurations.

FIGS. 1 to 13 illustrate a first embodiment of a deployable flight refuelling probe 8 which is stowed in a stowage area of restricted volume on board the aircraft and is deployable to a deployed position which is spaced well away from the cockpit of the aircraft and which is clearly visible by the pilot.

It will be understood that both these requirements are very important. The spacing is necessary to ensure that the possibility of the refuelling drogue hitting sensitive parts of the aircraft is minimize and the visibility is necessary to provide the aircraft pilot with maximum assistance in coupling the refuelling probe to the drogue.

It will also be understood that there is very little free stowage volume in the cockpit area of an aircraft, particularly when, as is common, the nose of the aircraft is carrying sensitive radar equipment and this volume is not available for stowage of the probe 8.

In general terms, the flight refuelling probe arrangement illustrated in the drawings comprises a first arm member in the form of an inner tube 10 mounted on the aircraft structure 6 for pivotal movement about a first axis 'P'; a second arm member in the form of an outer tube 12 telescopically mounted on the inner tube 10; a collar 14 rotatably connected to the inner end 16 of the outer tube; a radius arm 18 having one end mounted on the aircraft structure for pivotal movement about a second pivotal axis 'Q' spaced from and parallel to the first pivotal axis 'P', and the other end of the radius arm 18 being pivotally connected to said collar 14; a linear actuator 20 with associated linkages for driving the radius arm 18 to pivot about the second pivotal axis 'Q' and thus to cause the flight refuelling probe to move from a stowed to a deployed configuration; and various cams and cam surfaces associated with the radius arm 18, said collar 14, and said outer tube 12 for imparting to the outer tube 12 a pre-programmed rotation and subsequent locking relative to the collar 14 as the radius arm pivots with respect to the collar 14 as the flight refuelling probe 8 moves to its deployed configuration.

Figure 2:
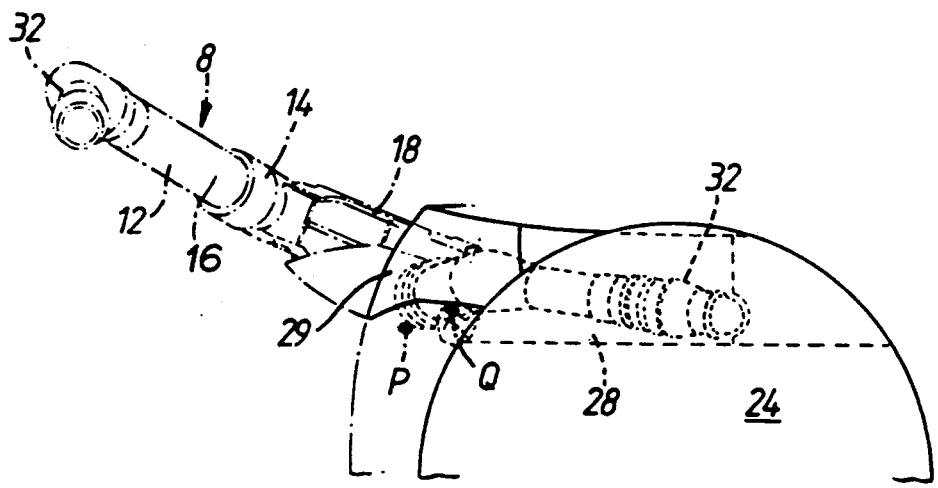
FIG. 2 is a front view on part of the aircraft of FIG. 1, showing the probe in both the stowed and extended configurations.
Figure 3:
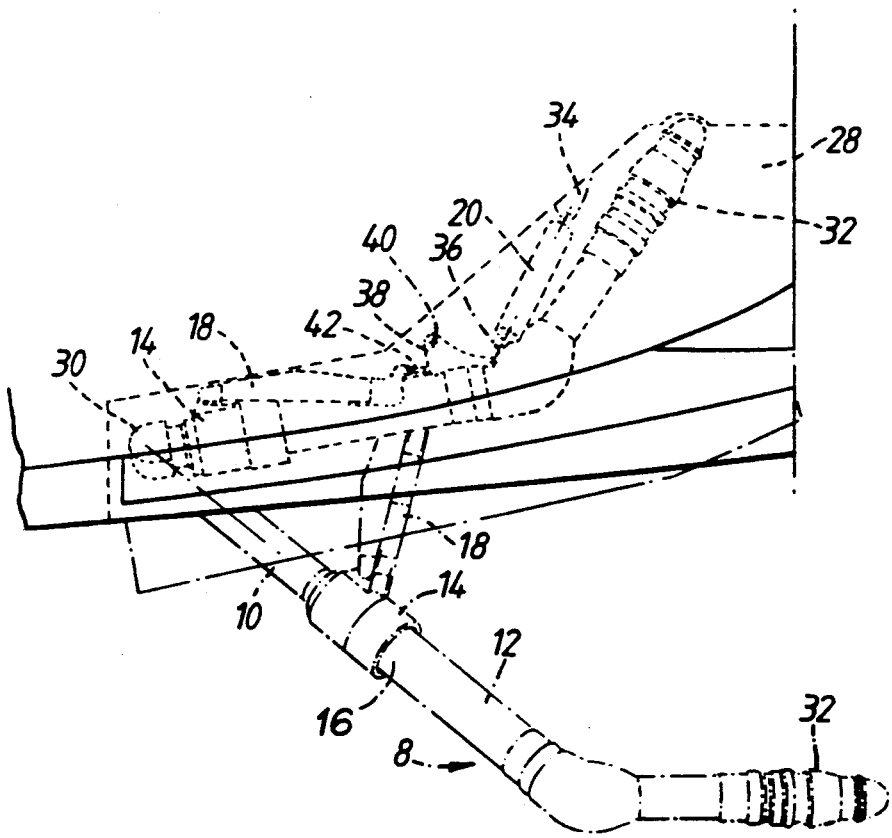
FIG. 3 is a top plan view on part of the aircraft of FIG. 1 showing the probe in both the stowed and extended configurations.

Referring now specifically to FIGS. 1 to 3, the cockpit includes a canopy 22, a radome 24 extending forwardly of the cockpit to house radar equipment, and a tiltable canard 26. The flight refuelling probe when stowed lies in a restricted storage volume 28 in the fuselage below the lower edge of the canopy 22 behind a folding door 29. The storage volume 28 does not impinge on the area reserved for the radar equipment. Referring to FIGS. 2 and 3 it will be seen that the refuelling probe and its deployment mechanism occupies a much smaller volume than would appear to be necessary, given the size and orientation of the probe when deployed.

FIG. 4 shows the attachment of the inboard end of the probe to the aircraft structure and the actuator and its associated linkages. The inner end of the inner tube 10 is attached to the aircraft structure by a pivotal mounting 30 which allows pivotal movement of the inner tube 10 about the first axis 'P'. The inner tube 10 slidably supports the outer tube 12 for telescoping movement. The inner end 16 of the outer tube 12 supports the collar 14. The outer tube 12 has a portion which extends coaxially with respect to the inner tube 10 and another portion which is cranked through about 45 thereto and which carries at its free end the male portion 32 (FIG. 5) of the probe 8 which mates with the refuelling drogue (not shown). The interrelationship between the inner and outer tubes will be described below.

The linear actuator 20 has one end pivotally coupled to a bracket 34 fixed to the aircraft structure. The rod 36 of the actuator is pivotally coupled to an arm of a crank 38 which is pivotally attached at 40 to the aircraft structure. A connecting rod 42 interconnects the crank 38 with a spur 44 of the radius arm 18. The radius arm 18 is pivotally attached at one end at 46 to the aircraft structure for movement about the second axis 'Q'. The other end of the radius arm is pivotally coupled at 48 to the collar 14. The inner tube 10, the collar 14 and the radius arm 18 together comprise a four-bar single slider chain which is driven by the linear actuator 20 and which moves generally within a single plane (the plane of the paper in FIG. 4). From the stowed position shown in FIG. 4, extension of the actuator rod 36, causes the radius arm 18 to rotate anti-clockwise about the second axis 'Q' and thus will cause the inner tube 10 to rotate clockwise about the first axis 'P' concurrently with sliding movement of the collar 14 relative to the inner tube 10. From the position in FIG. 4 the sliding movement will initially be in a contracting sense (i.e. with the collar 14 moving towards the first axis 'P') until the radius arm 18 reaches the bottom dead centre position and thereafter the sliding movement will be in an extension sense.

The radius arm 18 has a driving plate 50 attached thereto adjacent the pivotal attachment 48 of the radius arm 18 to the collar 14. The driving plate 50 rotates with the radius arm 18 as the latter pivots about pivotal attachment 48.

Reference is now made to FIGS. 6 and 7 which show a longitudinal section view through the collar 14 and the associated parts of the mechanism with the radius arm 18 removed for clarity. The centreline of the radius arm is shown at 18'.

The collar 14 includes a main cylindrical part 52 and a forward sleeve part 54, both surrounding the outer tube 12. The outer tube 12 has at its inner end region an external annular rib 56 which sits in a recess 58 in the forward sleeve part 54 so that the collar 14 as a whole is capable of limited axial movement with respect to the outer tube assembly against the influence of a compression spring 60. During deployment of the mechanism, however, thrust is transmitted from an abutment region on the main cylindrical part 52 of the collar 14 to the rib 56. The inner end of the main cylindrical part 52 of the collar 14 slidably receives a claw release sleeve 62 for limited sliding movement. The claw release sleeve 62 is biased towards the left as viewed in FIG. 6 by a compression spring 64. A shell-like latch plate 66 is secured to the inner surface of the end of the outer tube 12, and cooperates with the claw release sleeve 62 and a further claw member (not shown in FIG. 6) to lock the outer tube 12 in its fully extended position as to be described below.

The main cylindrical part 52 of the collar includes two longitudinally extending slots 68 spaced circumferentially by about 160° (see particularly FIGS. 4 and 7). A pin 70 is received in each slot and the outer end of each pin is received in a cam slot 72 in a respective one of the driving plates 50. Each cam slot 72 has a short portion 74 of volute form and a longer portion 74' which lies on the arc of a circle centered on the pivotal attachment 48 of the radius arm 18 (and thus the driving plates 50) to the collar 14. The geometry of each cam slot 72 is such that it moves the associated pin 70 from a rear end to a front end of the slot 68 during roughly the first half of the arc of travel of the driving plate during deployment of the mechanism and then maintains the pin at the front end of the slot for the remainder of the arc of travel.

Referring particularly to FIG. 7, each pin 70 passes through the associated slot 68 and engages a respective bore 74 in a locking ring 76 of cylindrical shell-form which is slidably located in the main cylindrical part 52 of the collar 14. The outer surface of the locking ring 76 and the inner surface of the main cylindrical part 52 are complementarily splined as can be seen clearly in FIG. 7 so as to allow relative axial sliding movement but to prevent relative rotation of said locking ring 76 and main cylindrical part 52. The inner surface of the locking ring 76 is cylindrical and slides over the outer surface of the outer tube 12. The forward end of the locking ring 76 is provided with castellations 77 which engage with complementary castellations 78 provided on the inner end of the outer tube 12 when the locking ring is moved forward by the pins 70 as they are driven to the front end of the slots 68.

Figure 10:
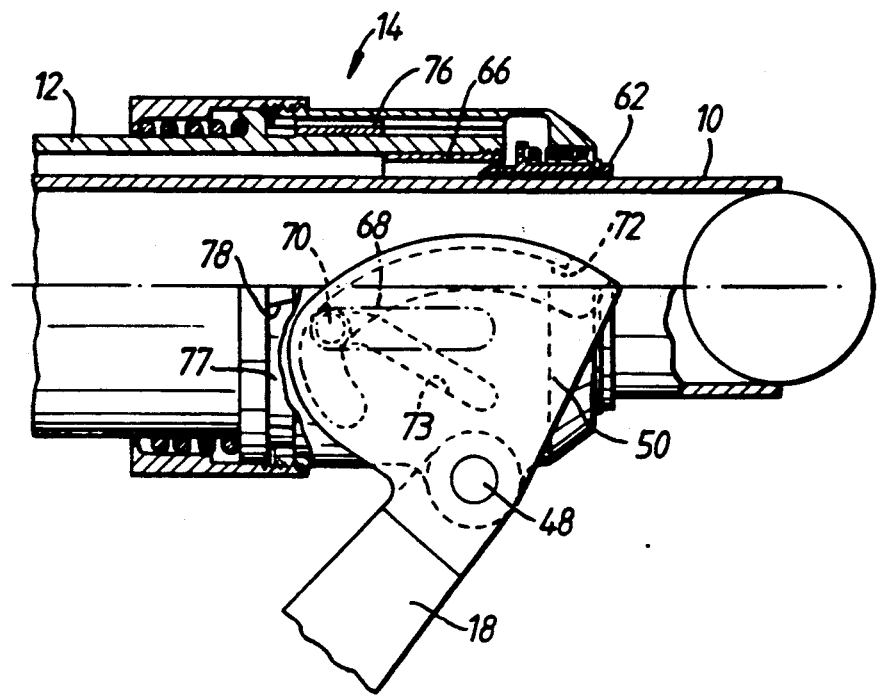
Figure 11:
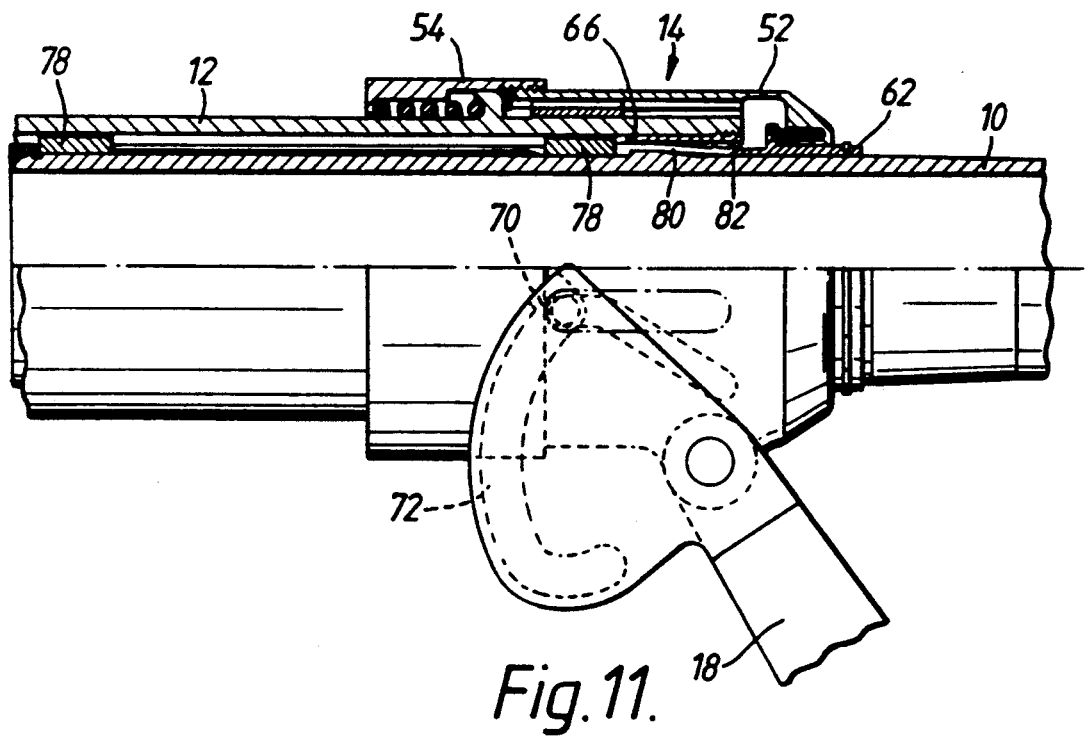

The inner end of each pin 70 is of reduced diameter and is received in a respective cam groove 73 in the outer surface of the outer tube 12. The cam groove 73 has a main portion 75 of generally helical shape and a linear end portion 77'. As the pins 70 are moved along the associated slots 68 from the rear ends to the front ends, the outer tube 12 is caused to turn about its longitudinal axis as the pins pass along the main portions 75 of the grooves 74 until the pins 70 reach the linear end portions 77'. This state is illustrated in FIG. 9. As the pins 70 pass along the linear end portions 77 no further rotation occurs between the collar 14 and the outer tube 12, and the locking ring 76 is brought forwardly to bring the castellations 77 and 78 into engagement and to lock the collar 14 and the outer tube 12 against relative rotation. This state is illustrated in FIG. 10 and occurs at or shortly after, maximum contraction of the outer tube 12 and the inner tube 10.

Further pivoting movement of the radius arm 18 about the second pivotal axis 'Q' telescopically extends the outer tube 12 with respect to the inner tube, but because the outer ends of the pins 70 are received in the circular, longer portion 74' of the cam slot 72, there is no movement of the pins relative to the slots 68 in the collar 14.

Figure 12:
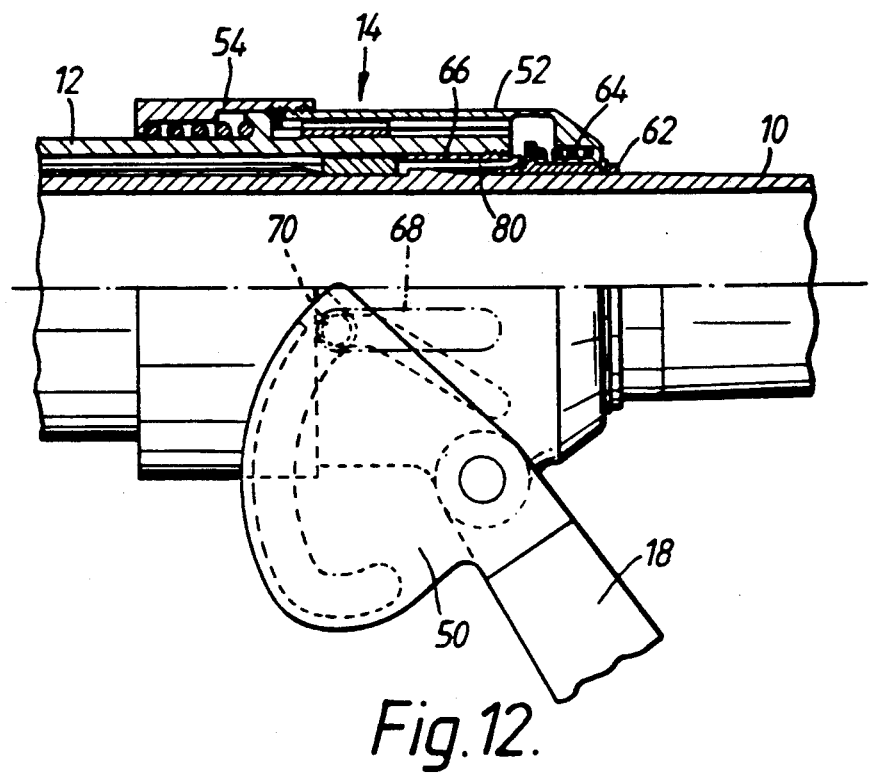
Figure 13:
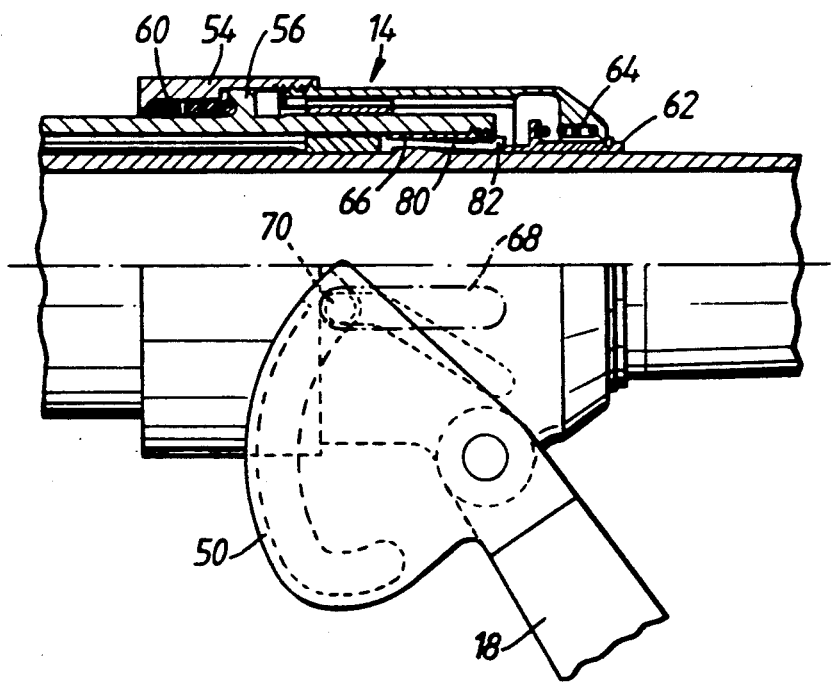
FIG. 13 is a longitudinal section view through the collar assembly of the probe as the probe moves away from the fully extended, configuration in a stowing operation.

The telescopic extension of the outer tube continues until the inner end of the outer tube 12 approaches the outer end of the inner tube 10. The outer end of the inner tube 10 includes two spaced bearings 78' on the inner tube 10 which support the inner tube 10 and the outer tube 12 for relative sliding movement, together with a resilient claw member 80 secured to the inner member and having a claw portion 82. As the outer tube extends towards its maximum extension, the latch plate 66 passes over the claw portion 82. During movement of the claw portion 82 under the latch plate 66, the claw release sleeve 62 engages the claw portion 82 (FIG. 11), and urges the claw portion outwardy until it can latch with the rearward surface of the latch plate 66. When this occurs, the claw release sleeve moves forwardly under the influence of the spring 64 to maintain the claw portion 82 in locking engagement with the rear end of the latch plate 66 to prevent telescopic contraction of the outer tube 12 with respect to the inner tube 10 (FIG. 12).

In this way, the axial loads generated as the male portion 32 mates with the refuelling drogue are transmitted from the outer tube 12 to the inner tube 10. It should be noted that the latch plate 66 also functions as an outstop, in combination with the inner bearing 78', to prevent over extension of the outer tube and also to resist drogue disengagement loads.

When it is wished to return the assembly from its deployed configuration to its stowed configuration, the actuator 20 is actuated to retract the rod 36. During the first few degrees of retraction movement of the radius arm 18, the sleeve 14 is moved axially with respect to the outer tube 12 against the influence of compression spring 60. This action draws the claw release sleeve 62 rearwardly so that the claw portion 82 is no longer maintained in engagement with the rear end of the latch plate 66, and the claw member so returns to its rest position against the outer surface of the inner tube 10, thus allowing telescopic contraction of the outer tube 12 over the inner tube. The stowage volume 28 and the associated door 29 are designed to accept the modified geometry of the probe 8 which results if the collar 14 does not return to its equilibrium position with respect to the outer tube 12. The remainder of the stowage action is the reverse of the deployment action, with the radius arm 18 drawing the collar 14 back down the inner tube 10.

It will be noted that the present arrangement allows a complex sequence of rotations, extensions, and lockings to be made whilst using a single linear actuator as the sole drive. The programming of this sequence of operations is achieved primarily through the collar 14 and the radius arm 18 and their mechanical interaction with the other elements of the system. A major advantage of the specific embodiment illustrated is that the outer tube 12 is locked both against axial movement and rotational movement with respect to the inner tube 10 when fully deployed so that a significant proportion of the loads sustained when the probe is deployed is transmitted down the outer and inner tubes and reacted at the pivotal mounting 30 of the inner tube 10.

Referring to FIGS. 14 to 21, the second embodiment of the flight refuelling probe illustrated is similar in overall layout, storage position, deployed position and actuation to those of the first embodiment but the construction and operation of the collar assembly are different. Thus, the inner tube 10 is pivoted at 'P' to a fixed aircraft structure and the outer tube 12 is slidably mounted on the inner tube 10 by means of a bearing 78' (see FIG. 18). The inner end of the outer tube 12 carries a collar 114, which is pivotally connected at 148 to a radius or drive arm 118, which is pivoted to the aircraft structure and coupled to an actuator (not shown) which drives the drive arm 118 in the same manner as in the first embodiment.

The collar 114 is slidably mounted for limited locking movement on the inner end of the outer tube 12, and carries a castellated locking portion 116 which faces a complementary locking portion 110 provided on the inner end of the outer tube 12. The outer tube 12 and collar 114 are urged towards a locked position by means of springs 120. The outer tube 12 carries inner and outer external radial cams 122,122' each associated with a respective cam slot or track 124 in the drive arm 118 (see FIGS. 21(a) and (b)). The inboard cam track 124 in FIG. 21(b) defines a rotation/section 124', a locking section 124" and a deployment section 124"', and the associated cam 122 engages the cam track throughout all phases of movement. The outboard cam track 124 in FIG. 21(a) defines only a locking section 124" and a deployment section 124"', the associated cam 122' being "free" in the initial phase of movement.

Figure 18:
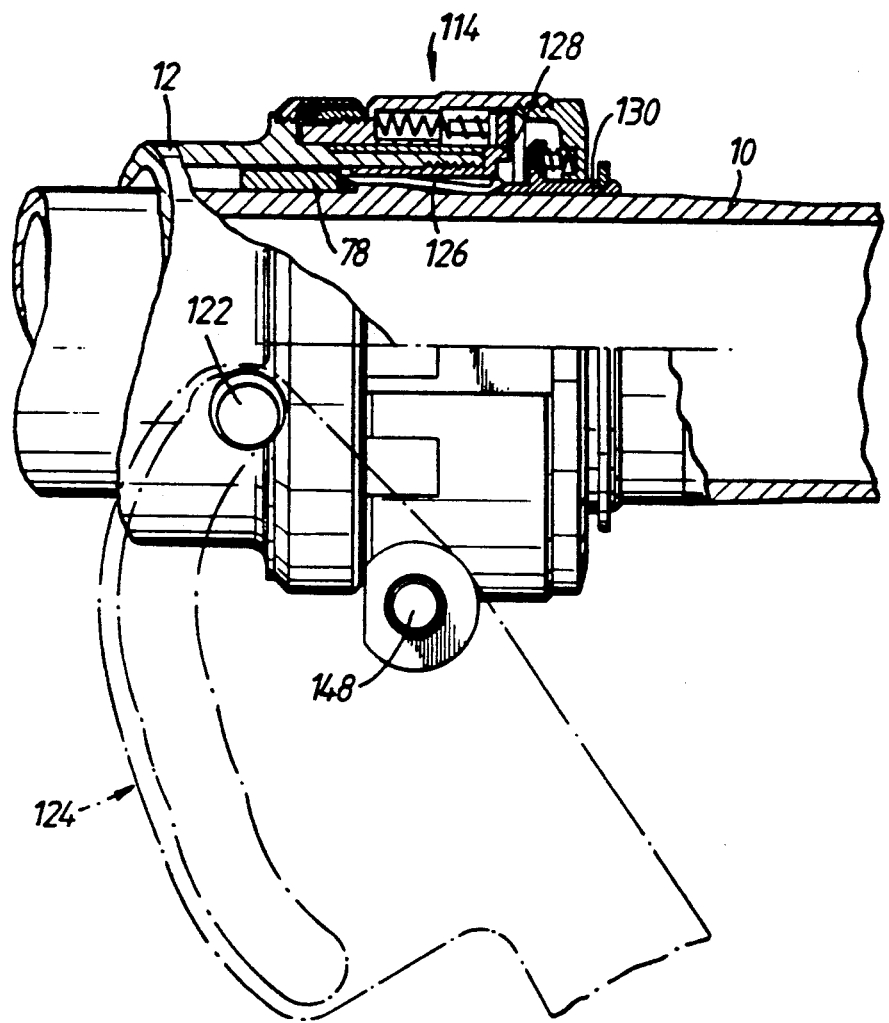

The outer end of the inner tube 10 includes a resilient claw 126 which usually lies against the outer surface of the inner tube. The inner end of the collar 114 is provided with a spring loaded foot 130 which, as the outer tube moves to its fully extended position, lifts and keeps the claw 126 into locking engagement with a latch plate 128 on the outer tube 12, thus preventing relative contraction of the inner and outer tubes (FIG. 18).

Figure 14:
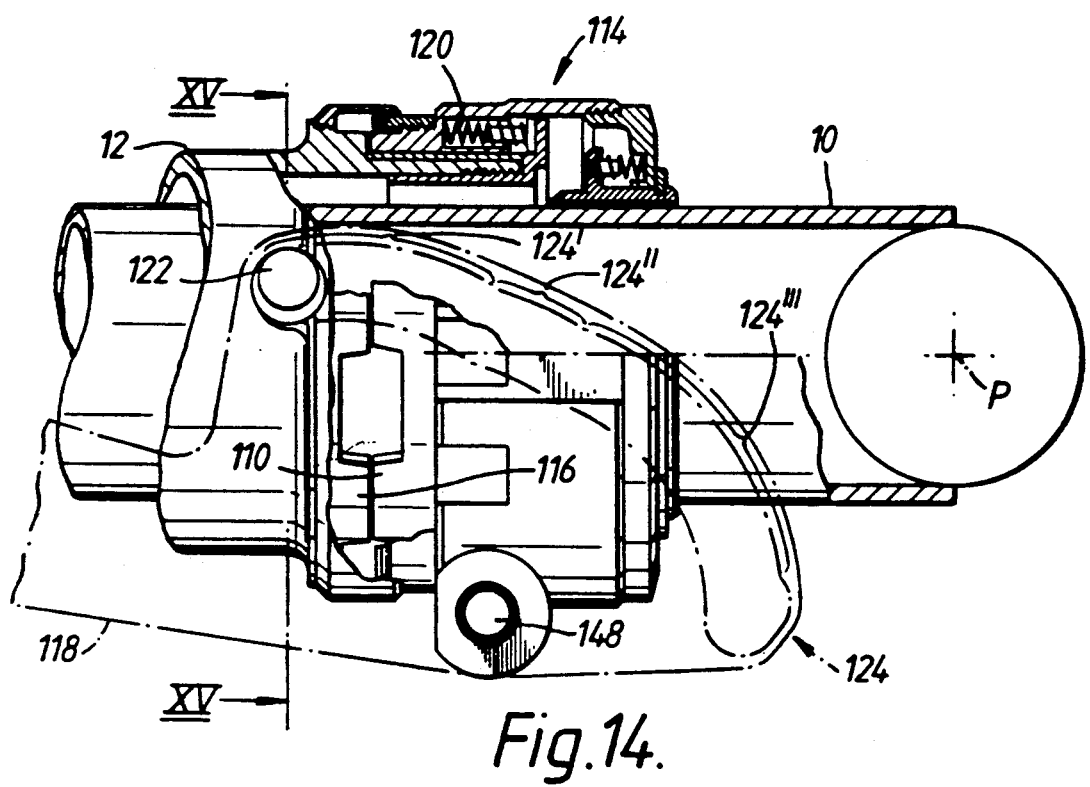
FIG. 14 is a part-sectioned detail view of a collar assembly of a flight refuelling probe in accordance with a second embodiment of the invention when in a stored position.
Figure 15:
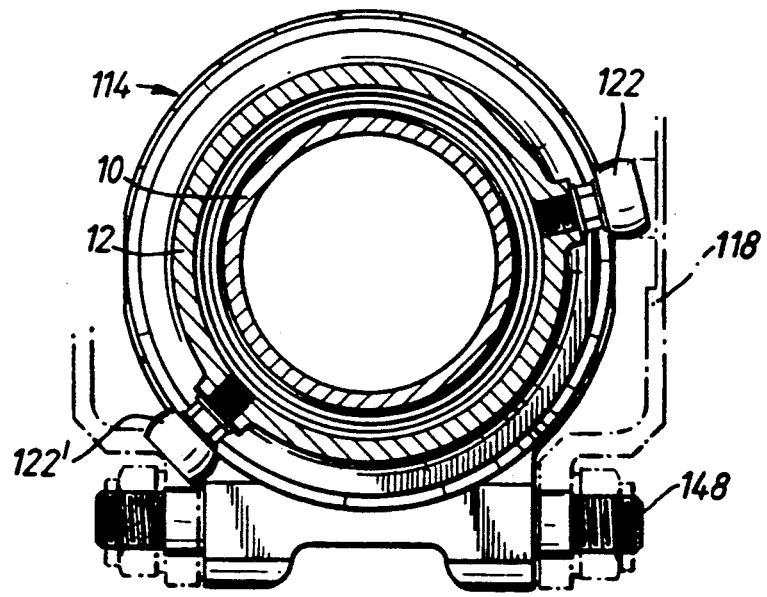
FIG. 15 is a transverse section view through the collar assembly taken on lines XV-XV of FIG. 14.
Figure 16:
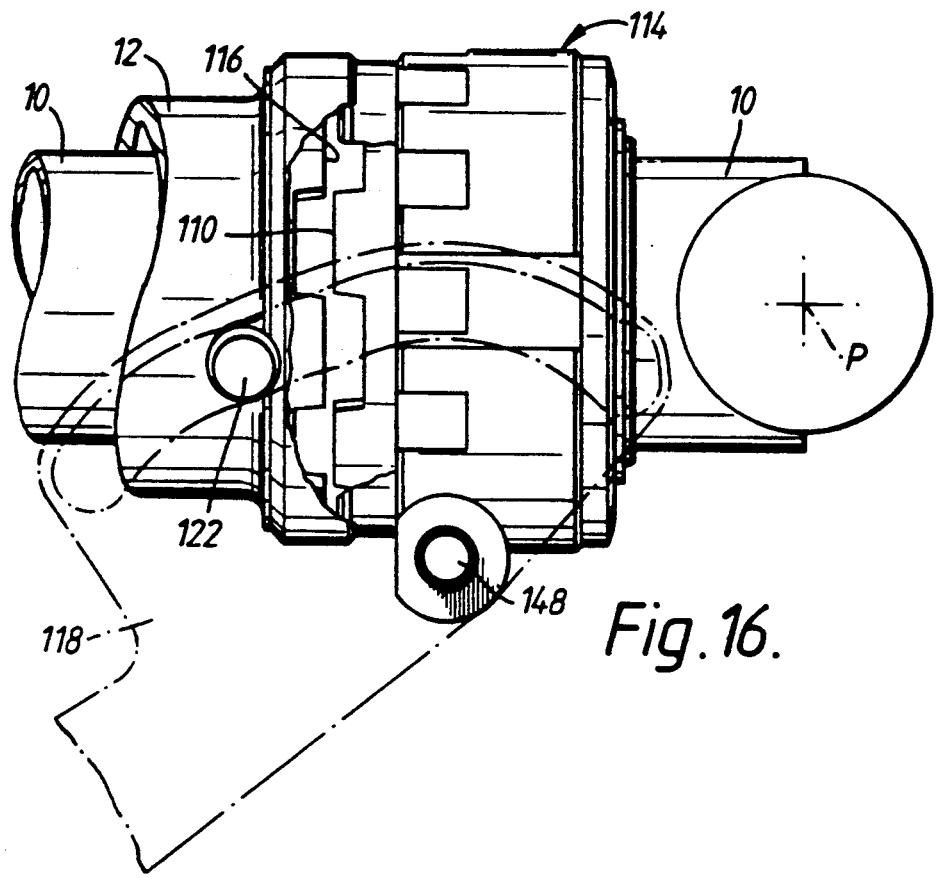
FIGS. 16 to 19 show successive detail views of the collar assembly of FIG. 14 when moving to a fully deployed position.
Figure 17:
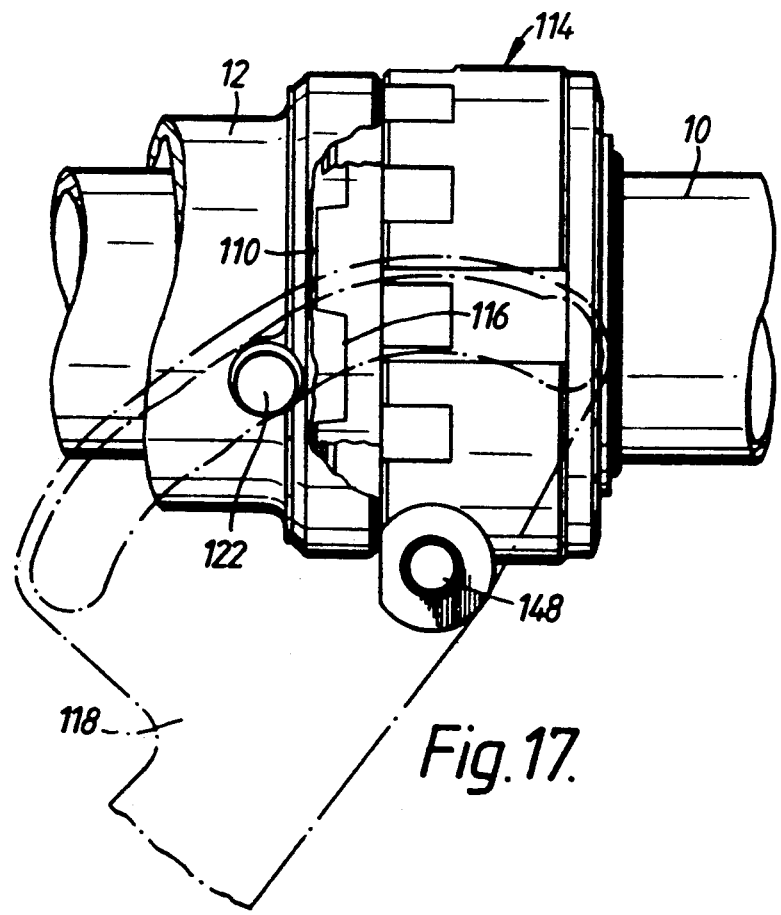
Figure 19:
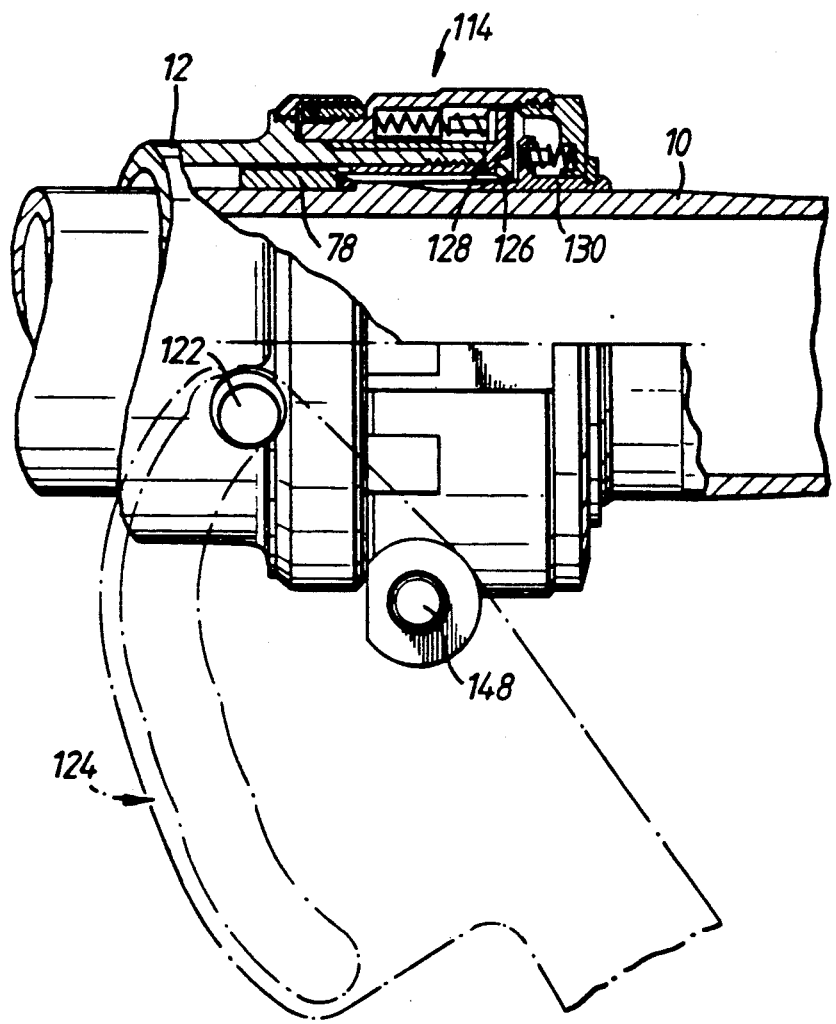
Figure 20:
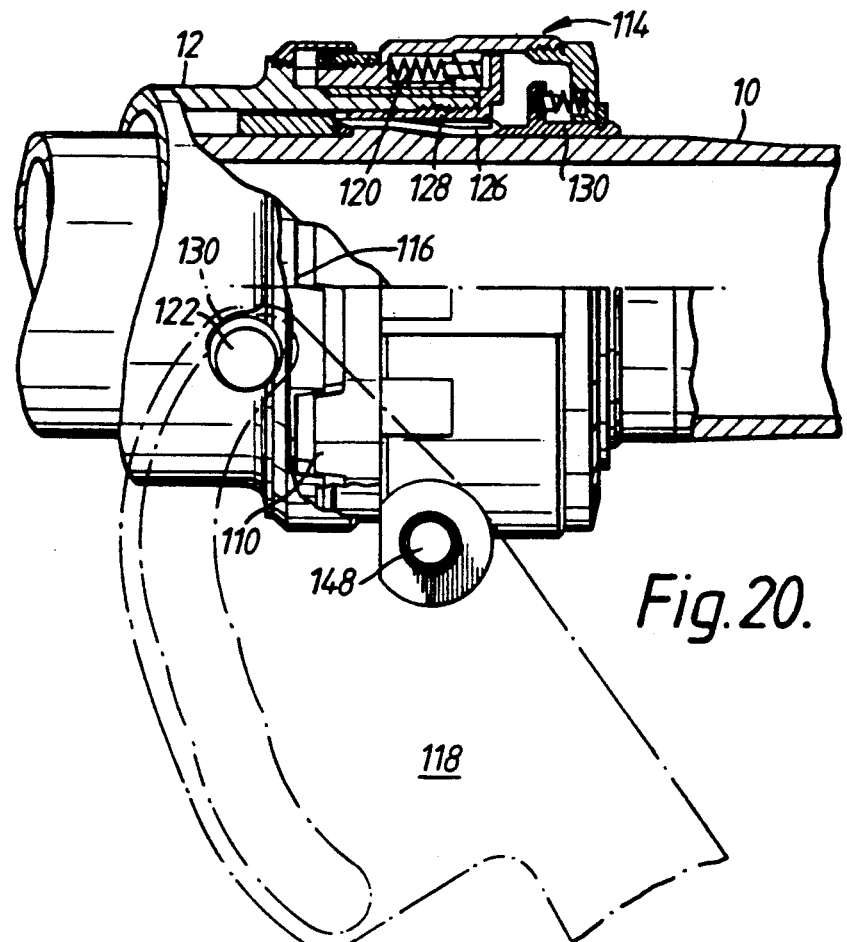
FIG. 20 shows a detail side view of the collar assembly when moved away from the fully deployed position of FIG. 19 back towards the stowed position, and FIGS. 21(a) and (b) show the drive plates sections of the outboard and inboard radius arm respectively.
Figure 21A:
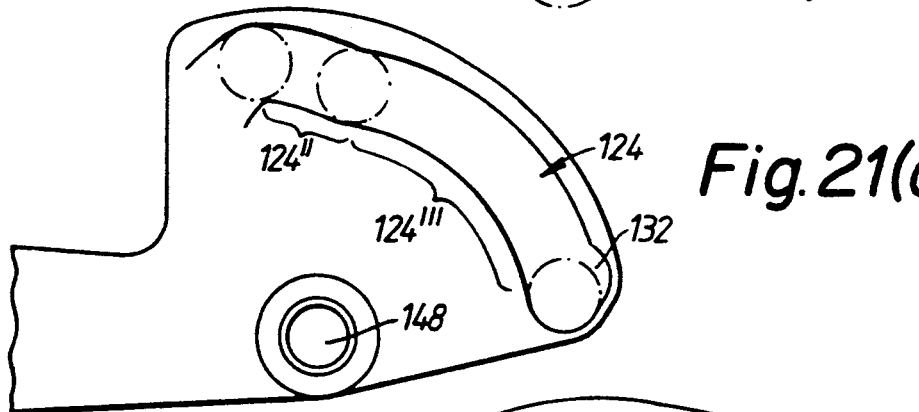
Figure 21B:
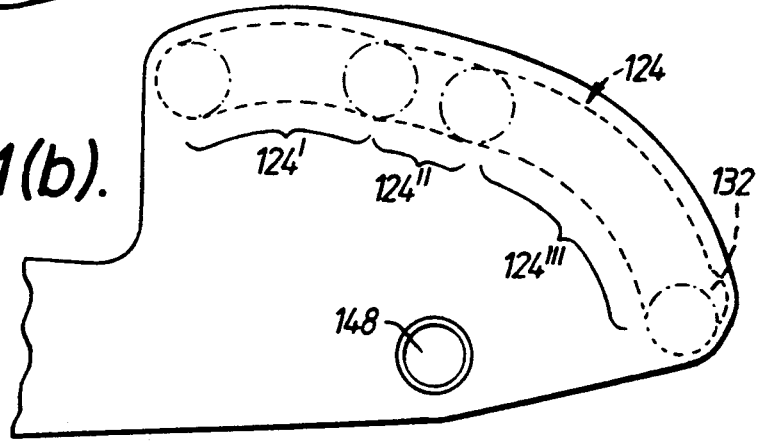

Deployment of the embodiment will now be described, when in the stored position shown in FIG. 14, the locking portions 116 and 110 are disengaged. Rotation of the drive arm 118 about its pivot on the aircraft structure causes pivoting of the drive arm 118 in the anticlockwise sense relative to the collar. The inboard cam 122 moves along the rotation section 124' of the inboard cam track 124 so that the outer tube 12 executes a programmed rotation relative to the inner tube about their common longitudinal axis (FIG. 16). Continued rotation of the drive arm causes the outboard cam 122' to engage the outbard cam track 124 and each cam passes into and along the locking section 124" of the cam track so that the locking portions 116 and 110 engage thereby preventing relative rotation of the inner and outer tubes (see FIG. 17). Thereafter, the cams pass along the deployment section 124'" of the cam tracks which are concentric with pivot 148 so that no camming movement is applied, and thus the outer tube 12 simply extends with respect to the inner tube 10. As the outer tube nears its outermost position, the latch plate 128 rides over the claw 126 and the spring loaded foot 130 engages the claw, moves against its spring bias (FIG. 18), and then lifts the claw 126 into locking engagement with the latch plate (FIG. 19). At this stage, the probe is fully extended and the inner and outer tubes are locked, both against relative contraction and against relative rotation.

To return the probe to its stowed position, the drive arm 118 is driven in the opposite sense. Initially, the inner and outer tube remain locked by the claw 126 against contraction so that the collar 114 slides away from the outer tube 12 against the bias of springs 120 thus pulling the springloaded foot 130 out from underneath the claw 126 so that the claw returns to its position against the inner tube, thus freeing the outer tube 12. To allow this initial unlocking movement, the ends of the cam tracks 124 are provided with a clearance lobe 132 which allows limited movement of the cams relative to the cam track.

Thereafter, stowage simply follows deployment, but in reverse order.

It will be understood that many modifications are possible to the arrangements illustrated. Indeed, the principals of the invention may be applied to many different types of deployment arrangements which require a complex programmed sequence of rotational and translational movements, and perhaps also requiring sequential locking of at least some of these movements.

In the second embodiment, the cam tracks 124 are radial about the probe axis to give line contact between cam and follower. The cam profile ensures both cam followers are driven smoothly during rotation with fail-safe locking. There is a positive drive path through the collar assembly. When the probe of this embodiment is fully extended, the claw 126 takes both the over extension load (i.e. a load tending to extend the outer tube) and the engagement load (i.e. a load tending to contract the outer tube).

We claim:

1. A deployment arrangement comprising:
   a fixed structure;
   a first arm member mounted for pivotal movement with respect to said fixed structure;
   a second arm member mounted for sliding movement with respect to said first arm member;
   a collar assembly disposed intermediate said first and second arm members;
   a radius arm means mounted for pivotal movement with respect to said fixed structure and pivotally coupled to said collar assembly, and
   control means responsive to a predetermined pivotal movement of said radius arm means relative to said collar assembly to rotate said second arm member relative to said first arm member.

2. A deployment arrangement according to claim 1, wherein said control means includes cam track means and cam follower means, one of said cam track means and said cam follower means associated with the collar assembly and the other associated with one of said arm members.

3. A deployment arrangement according to claim 2, wherein said cam track means is associated with said radius arm means and said cam follower is associated with said first member.

4. A deployment arrangement according to claim 2 which includes locking means for releasably locking the arm members, said locking means being operable in response to a predetermined pivotal movement of said radius arm means relative to said collar assembly.

5. A deployment arrangement according to claim 4, wherein said locking means includes two complementary locking pieces movable axially into locking engagement, one locking piece associated with each arm member respectively.

6. A deployment arrangement according to claim 5, wherein said locking pieces comprise a toothed portion associated with one of said arm members and a complementary toothed portion associated with said collar assembly.

7. A deployment arrangement according to claim 1, which includes an axial lock operable releasably to lock the two arm members against relative axial movement in at least one direction.

8. A deployment arrangement according to claim 7, wherein said axial lock includes a locking claw movable to lock the arm members against axial movement and a release member for releasing the claw.

9. A deployment arrangement according to claim 8, wherein said claw is axially fixed with respect to one of said arm members and lockable with the other arm member and said release member is associated with said collar assembly.

10. A deployment arrangement for deploying an arm member, said arrangement including, a first arm member having one end pivotally mounted on a fixed structure for pivotal movement about a first axis, a second arm member slidably mounted on said first arm member, a collar means rotatably connected to the end of said second arm member nearer said first axis, by radius arm means having one end pivotally mounted on said fixed structure for pivotal movement about a second axis spaced from and generally parallel to said first axis and a other end being pivotally connected to said collar means, drive means for driving a kinetic mechanism defined by said first and second arm members, said collar means and said radius arm means from a stowed configuration to a deployed configuration, and movement control means associated with said radius arm means and being responsive to a predetermined pivotal movement of the radius arm means with respect to the collar means to effect a predetermined rotation of the second arm member with respect to the collar means.

* * * * *